US010066521B2

(12) United States Patent
Eberle et al.

(10) Patent No.: US 10,066,521 B2
(45) Date of Patent: Sep. 4, 2018

(54) METHOD FOR OPERATING AN INTERNAL COMBUSTION ENGINE

(71) Applicant: Andreas Stihl AG & Co. KG, Waiblingen (DE)

(72) Inventors: Christian Eberle, Korb (DE); Markus Weinig, Winnenden (DE); Claus Naegele, Stuttgart (DE); Mark Reichler, Remshalden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 194 days.

(21) Appl. No.: 14/336,759

(22) Filed: Jul. 21, 2014

(65) Prior Publication Data
US 2015/0020772 A1 Jan. 22, 2015

(30) Foreign Application Priority Data

Jul. 19, 2013 (DE) .................. 10 2013 012 135

(51) Int. Cl.
*F01M 9/04* (2006.01)
*F02B 75/02* (2006.01)
(Continued)

(52) U.S. Cl.
CPC .............. *F01M 9/04* (2013.01); *F02B 75/02* (2013.01); *F02D 33/003* (2013.01); *F02D 41/30* (2013.01); *F02D 41/3005* (2013.01); *F02D 41/32* (2013.01); *F02D 41/34* (2013.01); *F02M 37/0023* (2013.01); *F02M 37/0064* (2013.01); *F02B 2075/025* (2013.01); *F02D 2400/04* (2013.01); *F02D 2400/06* (2013.01); *Y02T 10/44* (2013.01)

(58) Field of Classification Search
CPC .... F01L 7/12; F02D 2400/04; F02D 2400/06; F02D 41/30; F02D 41/3005; F02D 41/32; F02D 41/34
USPC ....... 123/50 B, 52.5, 53.4, 55.6, 59.7, 190.3, 123/406.47
See application file for complete search history.

(56) References Cited

U.S. PATENT DOCUMENTS 3,931,814 A   1/1976  Rivere
4,290,394 A * 9/1981  Frank .................. F02B 61/045
                                                       123/472

(Continued)

FOREIGN PATENT DOCUMENTS

AT    408 250 B    9/2001
DE  28 02 634 A1   7/1978

*Primary Examiner* — Sizo Vilakazi
*Assistant Examiner* — Kevin R Steckbauer
(74) *Attorney, Agent, or Firm* — Walter Ottesen, P.A.

(57) ABSTRACT

An internal combustion engine has an intake channel which opens via a first valve into a crankcase of the engine. The first valve opens at a first frequency ($f_1$). The engine has a second valve, which controls the quantity of fuel supplied into the intake channel. The quantity of fuel is controlled by controlling the time interval during which the second valve is open during each engine cycle (x). A control device is provided to control the quantity of fuel supplied. In a first operating state, the second valve is opened at a second frequency ($f_2$, $f_3$, $f_4$) which is coordinated with the first frequency ($f_1$). In a second operating state, the second valve is opened independently of the first frequency ($f_1$).

18 Claims, 3 Drawing Sheets

(51) Int. Cl.
  *F02D 33/00* (2006.01)
  *F02M 37/00* (2006.01)
  *F02D 41/30* (2006.01)
  *F02D 41/32* (2006.01)
  *F02D 41/34* (2006.01)

(56) References Cited

U.S. PATENT DOCUMENTS

| | | |
|---|---|---|
| 4,979,480 A | 12/1990 | Daikoku et al. |
| 5,613,468 A * | 3/1997 | Ibara ................ F02B 25/14 123/184.54 |
| 7,140,352 B2 | 11/2006 | Nickel et al. |
| 7,150,249 B2 * | 12/2006 | Kato ................ F01M 1/14 123/73 AD |
| 7,441,518 B2 | 10/2008 | Naegele et al. |
| 8,386,149 B2 * | 2/2013 | Bellistri ................ F02D 31/007 123/470 |
| 8,701,633 B2 * | 4/2014 | Drake ................ F02D 41/3094 123/488 |
| 8,869,774 B2 * | 10/2014 | Sasaki ................ F02B 27/003 123/361 |
| 2010/0300407 A1 * | 12/2010 | Ravenhill ........ F02M 35/10032 123/468 |
| 2011/0209688 A1 * | 9/2011 | Drake ................ F02D 41/3094 123/488 |
| 2012/0111303 A1 * | 5/2012 | Toshihide ............ F02B 27/003 123/403 |
| 2013/0133618 A1 | 5/2013 | Larsson et al. |
| 2014/0048037 A1 * | 2/2014 | McAlister ............ F02M 57/06 123/297 |
| 2015/0083085 A1 * | 3/2015 | Ravenhill ............ F02D 7/002 123/48 R |

* cited by examiner

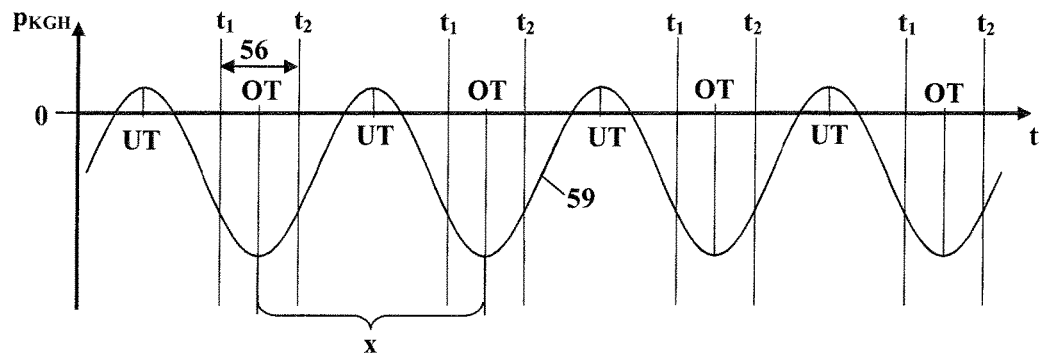
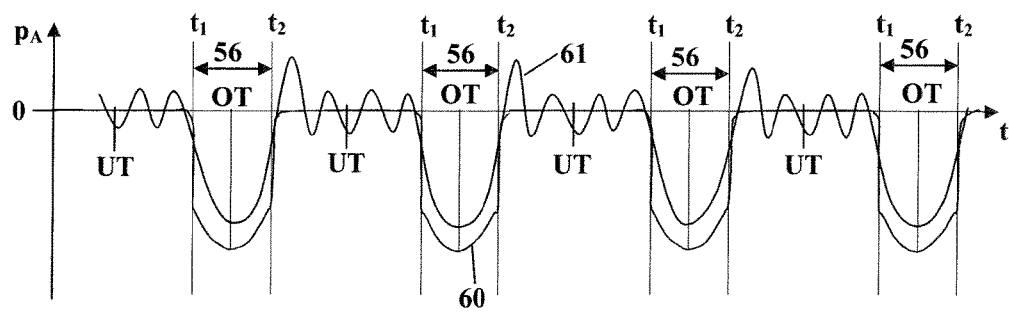
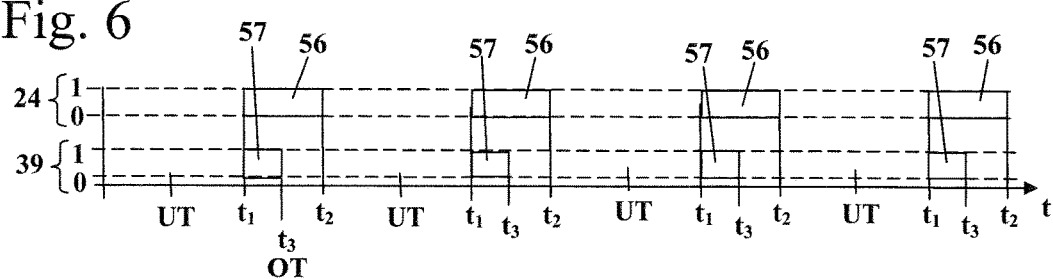
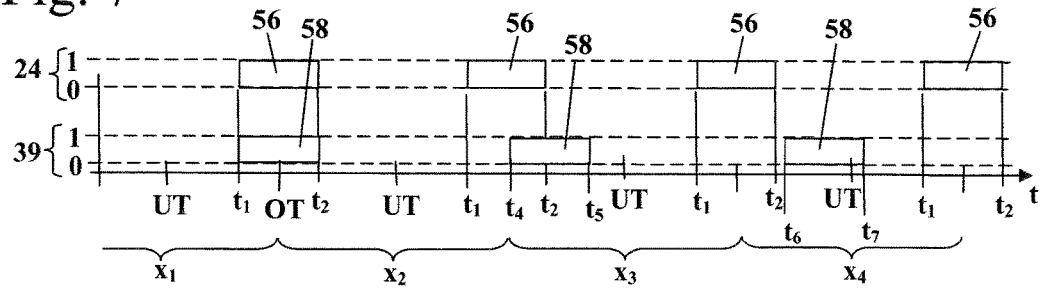

METHOD FOR OPERATING AN INTERNAL COMBUSTION ENGINE

CROSS REFERENCE TO RELATED APPLICATION

This application claims priority of German patent application no. 10 2013 012 135.3, filed Jul. 19, 2013, the entire content of which is incorporated herein by reference.

BACKGROUND OF THE INVENTION

U.S. Pat. No. 3,931,814 discloses a carburetor for an internal combustion engine, which has an electromagnetically operated valve. The valve is opened in synchronism with the cylinder intake phases. In order to adapt the quantity of fuel supplied, the opening times are varied as a function of operating parameters of the internal combustion engine.

In mixture-lubricated internal combustion engines, in particular in two-stroke engines or mixture-lubricated four-stroke engines, it is known to connect the intake channel to the crankcase of the internal combustion engine via a valve controlled by the piston skirt of a piston of the internal combustion engine. If the fuel is synchronously supplied to the intake tract via the fuel valve, the result is very short switching times of the valve, especially at high rotational speeds. As a result, a valve which reacts very quickly is needed. Because of the very frequent switching operations, especially at high rotational speeds, the service life of the valve is shortened.

SUMMARY OF THE INVENTION

It is an object of the invention to provide a method for operating an internal combustion engine which permits advantageous operation of the internal combustion engine.

In a first operating state, it is provided that the frequencies at which the valve which supplies the fuel and the valve which connects the intake channel to the crankcase are opened to be coordinated with one another. This ensures that, at the times at which the second valve is open, a sufficient negative pressure prevails in the region of the intake channel into which the second valve supplies the fuel, in order actually to achieve a flow of fuel into the intake channel. This is provided in particular in an operating state in which the pressure in the intake channel fluctuates greatly. However, such control of the supply of fuel may also be advantageous for other operating states. In a second operating state, the invention provides for the second valve to be opened independently of the first frequency, with which the first valve connects the intake channel to the crankcase. As a result, simple control can be achieved. At the same time, the number of switching cycles can be reduced via an appropriate choice of the second frequency, as a result of the fact that the frequencies are not coordinated with one another. As a result, an increased service life of the second valve is achieved.

The coordination of the first frequency with the second frequency is advantageously carried out by the first frequency being exactly as high as the second frequency, by the first frequency being an integer multiple of the second frequency, or by the second frequency being an integer multiple of the first frequency. Particularly advantageously, the two frequencies are the same or the second frequency is lower than the first frequency, so that the number of switching cycles of the second valve is reduced. In the second operating state, the second valve is opened independently of the first frequency. The second frequency is accordingly not coordinated with the first frequency in the second operating state. Advantageously, the ratio of first frequency to second frequency in the second operating state is not constant. This results in shifts between the opening times of the two valves, which change from engine cycle to engine cycle. The second frequency is advantageously lower here than the first frequency. As a result, the service life of the second valve can be increased.

In the first operating state, the first frequency and the second frequency are advantageously dependent on the rotational speed of the internal combustion engine. In the first operating state, the time interval during which the second valve is opened by the control device in order to supply fuel advantageously lies at least partly in a time interval during which the first valve is open. As a result, it is readily possible to achieve the situation where an adequate negative pressure prevails in the region of the intake channel into which the fuel is supplied, and thus an adequate quantity of fuel is supplied into the intake channel. Here, the fuel is advantageously supplied on account of the negative pressure prevailing in the intake channel. The pressure of the fuel supplied is advantageously low and lies in the range of the crankcase pressure or slightly below the latter. The fuel pressure is advantageously less than 2 bar positive pressure. Given low pressures of the fuel supplied, the quantity of fuel supplied is highly dependent on the negative pressure in the intake channel. If the frequencies at which the valves open and the opening times are not coordinated with one another, then the quantity of fuel supplied can fluctuate highly from engine cycle to engine cycle, and the result can be unsteady running of the internal combustion engine.

Advantageously, at least one fuel duct opens into the intake channel. The second valve controls, in particular, the quantity of fuel supplied into the intake channel via the at least one fuel duct. The second valve is accordingly not an injection valve which supplies the fuel directly into the intake channel, but a control valve which opens or closes a fuel channel leading into the intake channel. The first valve is advantageously formed by a piston skirt of a piston mounted so as to move to and fro in a cylinder of the internal combustion engine, which piston interacts with an inlet opening of the intake channel in the crankcase. The control times of the first valve depend on the rotational speed as a result and, within each engine cycle, are fixedly based on the crankshaft angle. The valve opens and closes exactly once during each engine cycle. The second valve advantageously has exactly two switching states, namely a completely open and a completely closed switching state. The second valve is accordingly a digitally switching valve. Partial opening of the second valve, for example in order to reduce the quantity of fuel supplied as compared with a completely open valve, is not possible in the case of a valve having exactly two switching states. The fact that the valve has only two switching states results in simple activation of the valve. It is possible to use a simply constructed valve. The control of the quantity of fuel supplied is carried out exclusively via the time interval during which the second valve is open or closed. The quantity of fuel taken into the intake channel in each time unit varies here as a function of the negative pressure which prevails in the intake channel. The second valve is advantageously an electromagnetic valve.

The first and the second operating state advantageously include different rotational speed ranges, wherein the rotational speeds of the first rotational speed range of the first operating state are lower than the rotational speeds of the second rotational speed range of the second operating state. The first rotational speed range is accordingly a lower rotational speed range than the second rotational speed range. The first operating state advantageously includes the starting operation. Here, the starting operation is the operation of the internal combustion engine from the start of the starter operation as far as the first combustion. The first operating state advantageously includes the idling operation. The second operating state advantageously includes the full load operation. Advantageously, the activation of the second valve switches over at rotational speeds of the order of magnitude from about 3500 to about 4000 revolutions per minute from the activation of the second valve according to the first operating state to the activation of the second valve according to the second operating state, in which the second valve is opened independently of the first frequency.

Advantageously, the quantity of fuel supplied is increased or reduced in order to limit the rotational speed of the internal combustion engine in an upper rotational speed range. The first operating state advantageously includes the upper rotational speed range. In the upper rotational speed range, the second valve is advantageously opened only when the first valve is also open. As a result, very accurate fuel metering is possible. The rotational speed can be limited either by increasing the quantity of fuel supplied, that is, by making the mixture richer, or by reducing the quantity of fuel supplied, that is, by making the mixture leaner.

BRIEF DESCRIPTION OF THE DRAWINGS

The invention will now be described with reference to the drawings wherein:

FIG. 4 is a graph which shows in schematic form the pressure variation in the crankcase of the internal combustion engine of the chain saw;

FIG. 5 is a graph which schematically shows the pressure variation in the intake channel of the chain saw in different operating states;

FIG. 6 is a graph which shows the opening times of the valves of the internal combustion engine in a first operating state;

FIG. 7 is a graph which shows the opening times of the valves of the internal combustion engine in a second operating state; and, FIG. 8 is a graph which shows the variation of the frequencies at which the valves are opened, for several embodiments.

DESCRIPTION OF THE PREFERRED EMBODIMENTS OF THE INVENTION

Figure 1:
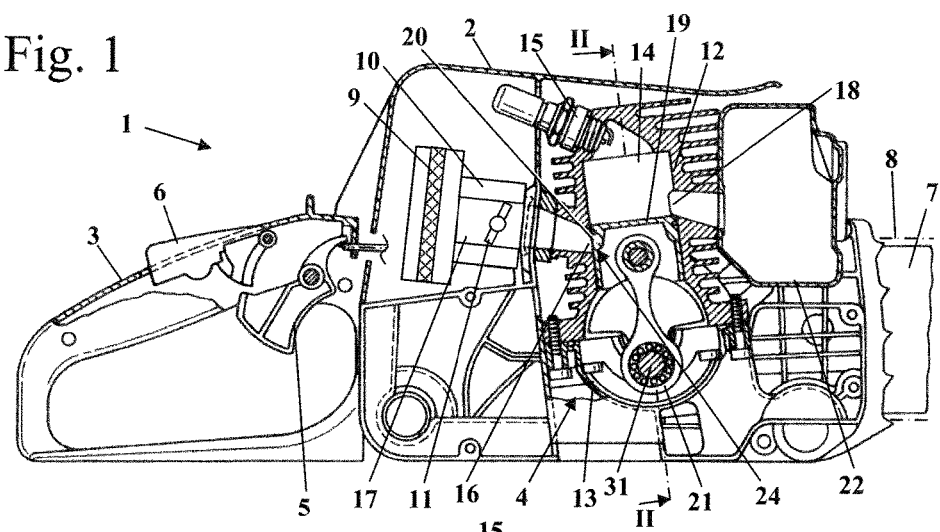
FIG. 1 is a schematic longitudinal section through a chain saw.

FIG. 1 shows, as an embodiment for a handheld work apparatus, a chain saw 1 having an internal combustion engine 4. However, the method according to the invention can also be used in internal combustion engines of other handheld work apparatuses, such as angle grinders, brushcutters, harvesting equipment, suction/blowing apparatus, lawn mowers or the like. The chain saw 1 has a housing 2 having a rear handle 3 fixed thereto. A throttle lever 5 and a throttle lever interlock 6 are pivotably mounted on the rear handle 3. On the side of the housing 2 that faces away from the rear handle 3, a guide bar 7 projects forward. A saw chain 8 driven by the internal combustion engine 4 is arranged on the guide bar such that it can circulate.

The internal combustion engine 4 takes in combustion air via an air filter 9 through an intake channel 17. One section of the intake channel 17 is formed in a carburetor 10 wherein a throttling element 11 is pivotably mounted. The throttle lever 5 acts on the position of the throttling element 11 and thus controls the quantity of combustion air taken in. The intake channel 17 ends at an inlet opening 16 on a cylinder 12 of the internal combustion engine 4. In the cylinder 12, a piston 19 is mounted such that it can move to and fro. The piston 19 delimits a combustion chamber 14 which is formed in the cylinder 12 and into which a spark plug 15 projects.

The internal combustion engine 4 is constructed as a single-cylinder engine, specifically as a two-stroke engine, in the embodiment shown. However, the internal combustion engine 4 can also be a mixture-lubricated four-stroke engine. The internal combustion engine 4 has a crankcase 13, into which the inlet opening 16 opens. The connection of the inlet opening 16 to the interior of the crankcase 13 is controlled by a piston skirt 20 of the piston 19. The piston skirt 20, together with the inlet opening 16, forms a first valve 24 which, as a function of the rotational speed of the internal combustion engine 4, opens and closes at respective predetermined positions of the piston 19 and a crankshaft 31 rotatably mounted in the crankcase 13. During its to and fro movement, the piston 19 drives the crankshaft 31 in a rotating manner via a connecting rod 21.

The first valve 24 is opened in the region of the top dead center position of the piston 19. When the first valve 24 is opened, the intake channel 17 is connected to the interior of the crankcase 13 via the inlet opening 16. In this position of the piston 19, combustion air and fuel supplied to the combustion air in the carburetor 10 is taken into the interior of the crankcase 13. During the downward stroke of the piston 19, that is, during the movement of the piston 19 in the direction of the crankcase 13, the fuel/air mixture in the interior of the crankcase 13 is compressed and, in the region of the bottom-dead-center position of the piston 19, is transferred into the combustion chamber 14 via transfer channels, not shown. During the subsequent upward stroke of the piston 19, that is, during the movement of the piston 19 away from the crankcase 13, the mixture in the combustion chamber 14 is compressed and is ignited by the spark plug 15 in the region of the top-dead-center position of the piston 19. An outlet opening 18, which is opened by the piston skirt 20 during the downward stroke of the piston 19, leads out of the combustion chamber 14. As a result, exhaust gases are able to flow out of the combustion chamber 14. Arranged on the cylinder 12 is an exhaust muffler 22, into which the exhaust gases flow.

Figure 2:
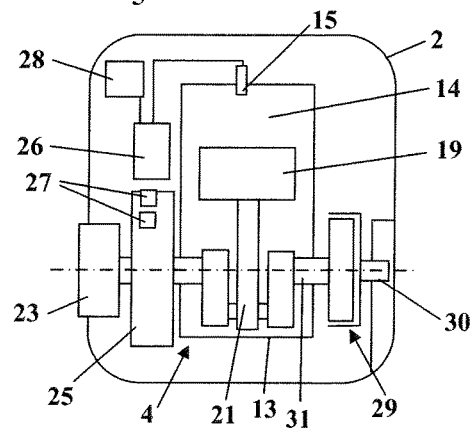
FIG. 2 is a schematic section through the chain saw of FIG. 1 along the line II-II in FIG. 1.

As FIG. 2 shows, the chain saw 1 has a starting device 23 for starting the internal combustion engine 4, which can be, for example, a pull-cord starter or an electrically driven starting device. Fixed to the crankshaft 31 is a flywheel 25 which, in the embodiment shown, is arranged between the crankcase 13 and the starting device 23. The flywheel 25 can be a fan wheel, for example.

Arranged on the outer circumference of the flywheel 25 are magnets 27, which induce a voltage in an ignition module 26 arranged adjacent to the outer circumference of the flywheel 25. The ignition module 26 is connected to the spark plug 15 and supplies the spark plug 15 with the energy induced in the ignition module 26 in order to provide an ignition spark. Also connected to the ignition module 26 is a control device 28. The control device 28 can also be integrated into the ignition module 26.

The control device 28 determines the time at which the ignition is triggered by the spark plug 15. The control device 28 additionally controls the quantity of fuel supplied to the internal combustion engine 4 by activating a second valve 39, shown in FIG. 3. On the side of the crankcase 13 facing away from the flywheel 25, the crankshaft 31 is connected to a centrifugal clutch 29. A drive sprocket 30 for driving the saw chain 8 is fixed to the output side of the centrifugal force clutch 29.

Figure 3:
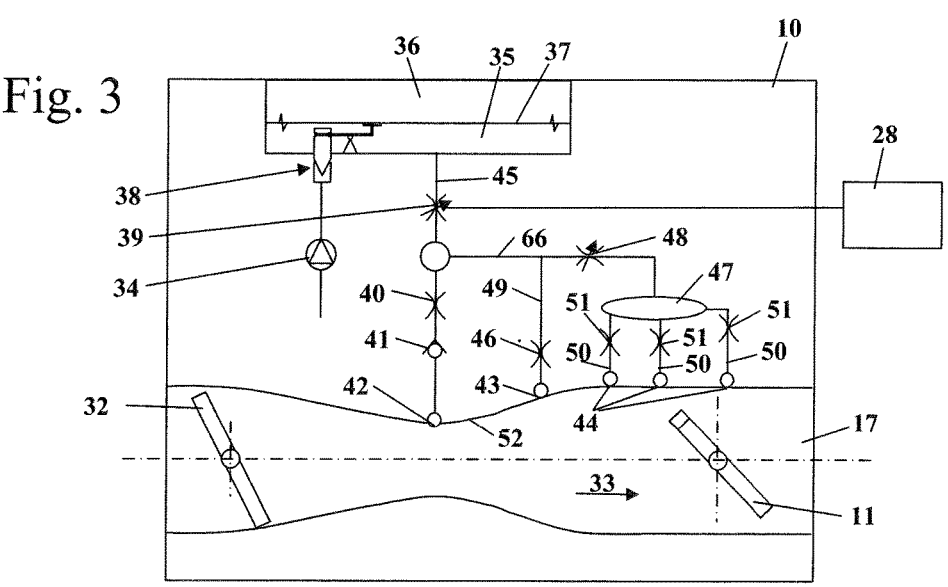
FIG. 3 shows a schematic of the carburetor of the chain saw from FIGS. 1 and 2.

FIG. 3 shows the carburetor 10 in schematic form. In the embodiment shown, the carburetor 10 is constructed as a conventional diaphragm carburetor. The carburetor 10 has a fuel pump 34 which, for example, can be a diaphragm pump driven by the pressure in the interior of the crankcase 13. The fuel pump 34 delivers fuel into a control chamber 35 of the carburetor 10. Arranged on the inlet of the control chamber 35 is an inlet valve 38, which controls the quantity of fuel passing into the control chamber 35. The control chamber 35 is separated by a control diaphragm 37 from a compensation chamber 36. A reference pressure which, for example, can be the pressure in the clean chamber of the air filter 9, prevails in the compensation chamber 36. The position of the inlet valve 38 is coupled to the position of the control diaphragm 37. If a pressure that is negative with respect to the compensation chamber 36 prevails in the control chamber 35, the inlet valve 38 opens. If the pressure has been compensated or if a pressure that is positive as compared with the compensation chamber prevails in the control chamber 35, the inlet valve 38 closes. The inlet valve 38 can be spring biased, in order to change and adjust the pressure level in the control chamber 35 with respect to that in the compensation chamber 36 and to match the opening characteristics of the inlet valve 38.

At least one fuel duct 45 leads out of the control chamber 35. In the embodiment, exactly one fuel duct 45 is provided. The quantity of fuel flowing through the fuel duct 45 is controlled by the second valve 39. The second valve 39 is formed as an electromagnetic valve. The second valve 39 is activated by the control device 28. In the embodiment, the second valve 39 has exactly two switching states, namely a fully open and a fully closed state. The control device 28 controls the quantity of fuel supplied to the intake channel 17 by controlling the time period in which the second valve 39 is open.

The fuel duct 45 opens into the intake channel 17 via a throttle 40 and a check valve 41 on a main fuel opening 42. The main fuel opening 42 is arranged in the area of a venturi 52. The fuel is taken into the intake channel 17 because of the negative pressure prevailing in the intake channel 17. A fuel duct 66 branches out of the fuel duct 45. An adjusting valve 48 is provided in the fuel duct 66. The fuel duct 66 opens into a fuel chamber 47 formed as an idling chamber. Via the adjusting valve 48, the quantity of fuel supplied into the intake channel 17 during idling can be adjusted. The adjusting valve 48 is preferably a needle valve. Three fuel ducts 50, which each have a throttle 51, lead out of the fuel chamber 47. Each fuel duct 50 opens into the intake channel 17 at an idling fuel opening 44. The idling fuel openings 44 are arranged in the region of the throttling element 11. The throttling element 11, in the embodiment shown, is formed as a throttle flap. If the throttling element 11 is closed completely, two of the idling fuel openings 44 are arranged upstream in the intake channel 17 in relation to a flow direction 33, and one of the idling fuel openings 44 is arranged downstream of the throttling element 11. The flow direction 33 is the direction in which combustion air flows from the filter 9 to the inlet opening 16.

In the embodiment shown, a dependent idling system is shown. The quantity of fuel supplied into the fuel duct 66 and to the idling fuel openings 44 is controlled by the second valve 39. However, provision can also be made for the fuel duct 66 to branch directly out of the control chamber 35 and for the quantity of fuel supplied to the idling fuel openings 44 not to be controlled by the second valve 39.

As FIG. 3 also shows, a fuel duct 49, which opens via a throttle 46 to a secondary fuel opening 43, branches out of the fuel duct 66. As FIG. 3 also shows, upstream of the throttling element 11 in the intake channel 17 there is arranged a choke element 32, which is formed as a choke flap in the embodiment shown. When starting the internal combustion engine 4, the choke element 32 is at least partly closed.

FIG. 4 shows the variation in the crankcase pressure $p_{KGH}$ as a function of several engine cycles (x). In the embodiment, each engine cycle (x) extends from a top-dead-center position OT of the piston 19 to the following top-dead-center position OT of the piston 19. As the line 59 shows, the crankcase pressure $p_{KGH}$ varies in a highly fluctuating manner. At the top-dead-center position OT of the piston 19, the crankcase pressure $p_{KGH}$ is lowest. As compared with the ambient pressure, negative pressure prevails in the crankcase 13. At the bottom-dead-center position UT of the piston 19, the crankcase pressure $p_{KGH}$ is highest. Here, the crankcase pressure $p_{KGH}$ is plotted as a difference relative to the ambient pressure. At the bottom-dead-center position UT of the piston 19, the crankcase pressure $p_{KGH}$ is higher than the ambient pressure. FIG. 4 also shows the opening time $t_1$ and the closing time $t_2$ of the first valve 24. The first valve 24 opens at an opening time $t_1$, which lies before the top-dead-center position OT, and closes at a closing time $t_2$ after the top-dead-center position OT. Here, the time at which the inlet opening 16 begins to open or begins to close is specified as the opening time $t_1$ and as the closing time $t_2$, respectively. The first valve 24 is open over a time interval 56 which extends from the opening time $t_1$ to the closing time $t_2$.

FIG. 5 shows the variation of the intake channel pressure $p_A$. The line 60 shows the pressure variation at low rotational speeds. At low rotational speeds, the negative pressure from the crankcase 13 is able to propagate into the intake channel 17 as long as the first valve 24 is open. In the time periods in which the first valve 24 is closed, approximately ambient pressure is established in the intake channel 17 via the filter 9. The pressure in the intake channel 17 corresponds approximately to the pressure variation of the crankcase pressure $p_{KGH}$ from the opening time $t_1$ until the closing time $t_2$. From the closing time $t_2$ until the following opening time $t_1$, the intake channel pressure $p_A$ corresponds approximately to the ambient pressure.

At high rotational speeds, the pressure equalization between ambient pressure and the intake channel pressure $p_A$ via the filter 9 cannot take place or can take place only partly, since the time is not sufficient for pressure equalization. The pressure variation established approximately in the intake channel 17 is shown schematically by a line 61. A fluctuating pressure is established, in which time periods in which the pressure lies above the ambient pressure and time periods in which the pressure lies below the ambient pressure alternate. The pressure fluctuates about the ambient pressure; the fluctuations can be different, depending on engine and rotational speed. FIG. 5 shows, by way of example, a possible pressure variation at high rotational speeds.

FIG. 6 shows the opening and closing times for the first valve 24 and the second valve 39 for a first operating state. The first operating state advantageously includes low rotational speeds, at which the pressure variation in the intake channel 17 corresponds approximately to the pressure variation indicated by the line 60 in FIG. 5. The first valve 24 opens at opening times $t_1$ and closes at closing times $t_2$, which correspond to the times $t_1$ and $t_2$ shown in FIGS. 4 and 5. The second valve 39 is advantageously activated in such a way that the time interval 57 for which the second valve 39 is open lies at least partly within the time interval 56. In the embodiment, the time interval 57 lies completely within the time interval 56. The second valve 39 opens at the same time as the first valve 24, at the opening time $t_1$. The second valve 39 closes at a closing time $t_3$, which lies before the closing time $t_2$. In the embodiment, the closing time $t_3$ lies approximately at the top-dead-center position OT. The closing time $t_3$ is advantageously controlled by the control device 28 as a function of the quantity of fuel to be supplied. As FIG. 6 shows, both the first valve 24 and the second valve 39 are either completely closed or completely open. Both the valves have exactly two switching states. In FIG. 6, the first, completely closed switching state is designated by "0", and the second, completely open switching state is designated by "1".

FIG. 7 shows an embodiment for the activation of the second valve 39 in a second operating state, in which the pressure variation in the intake channel 17 corresponds approximately to the variation indicated by the line 61 in FIG. 5. The pressure with the first valve 24 closed fluctuates around the ambient pressure, so that when the first valve 24 is closed, the result is time periods with negative pressure and time periods with positive pressure, which alternate in a rapid sequence. Because of the time intervals in which negative pressure prevails, fuel can also be taken into the intake channel 17 with the first valve 24 closed.

In the embodiment according to FIG. 7, three opening and closing operations of the second valve 39 are shown. In a first engine cycle $x_1$, the second valve 39 opens at the same time as the first valve 24 at the opening time $t_1$ and closes at the same time as the first valve 24 at the closing time $t_2$. The second valve 39 is open over a time interval 58, which is just as long as the time interval 56 for which the first valve 24 is open, and coincides with the time interval. In a second engine cycle $x_2$, the first valve 24 opens at an opening time $t_1$. The second valve 39 opens only in the following engine cycle $x_3$, to be specific shortly after the top-dead-center position OT, at an opening time $t_4$. After that, the first valve 24 closes at a closing time $t_2$. Only thereafter does the second valve 39 close at a closing time $t_5$. The time intervals 56 and 58, for which the first valve 24 and the second valve 39 are open, are equally long but overlap only partly. At the end of the third engine cycle $x_3$, the first valve 24 opens at the opening time $t_1$ and closes in the fourth engine cycle $x_4$ at the closing time $t_2$. During the time interval 56, the second valve 39 is not open. The second valve 39 opens at an opening time $t_6$, which lies after the closing time $t_2$ of the first valve 24, and closes at a closing time $t_7$ which, in the embodiment, lies after the bottom-dead-center position UT. In this engine cycle, the time intervals 56 and 58 do not overlap. On account of the temporary negative pressure prevailing in the intake channel 17, even when the first valve 24 is closed, fuel is nevertheless supplied into the intake channel 17 during the time interval 58.

In the switching scheme of the second valve 39 shown in FIG. 6, the first valve 24 and the second valve 39 open at the same frequency, which corresponds exactly to the rotational speed of the internal combustion engine 4. The two valves (24, 39) are advantageously opened simultaneously here. However, provision can also be made for a time offset to be provided between the opening times $t_1$ of the two valves 24 and 39. This is practical in particular when the negative pressure from the interior of the crankcase 13 is present on the main fuel opening 42 of the intake channel 17 only with a time delay, for example on account of a correspondingly great length of the intake channel 17. The second valve 39 then advantageously opens when the negative pressure from the interior of the crankcase 13 prevails at the main fuel opening 42.

In the switching scheme of the second valve 39 shown in FIG. 7, the frequency with which the second valve 39 is opened is lower than the frequency of the first valve 24 here. The frequency of the second valve 39 is less than half as high as the frequency of the first valve 24 here. When the second valve 39 is opened and closed is defined solely on the basis of the quantity of fuel to be supplied. The frequency with which the first valve 24 is opened is not taken into account here. The result is shifts between the time intervals 56 in which the first valve 24 is open and the time intervals 58 in which the second valve 39 is open, the shifts changing from engine cycle to engine cycle. The frequency with which the second valve 39 is opened is advantageously lower than the frequency with which the first valve 24 is opened here. As a result, the service life of the second valve 39 can be increased. The fact that negative pressure prevails temporarily in the intake channel 17, even when the first valve 24 is closed, means that a sufficiently large quantity of fuel can be supplied. In particular at high rotational speeds, for example under full load, the less accurate metering of the fuel resulting from the shift of the opening times of the valves 24 and 39 which is caused by the phase shift is tolerable.

Figure 8:
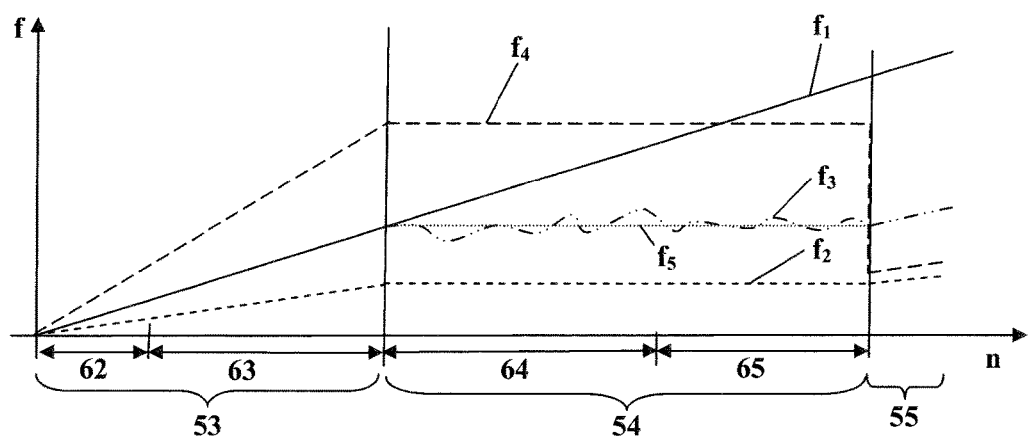

FIG. 8 shows in schematic form the variation of a first frequency $f_1$ with which the first valve 24 is opened, over the rotational speed (n). The frequency $f_1$ is proportional to the rotational speed (n). The internal combustion engine 4 has a first rotational speed range 53, which includes a starting rotational speed range 62 and an idling rotational speed range 63. The internal combustion engine 4 has a second rotational speed range 54, which lies above the first rotational speed range 53 and which includes a part-load rotational speed range 64 and a full-load rotational speed range 65. The internal combustion engine 4 additionally has an upper rotational speed range 55, which lies above the second rotational speed range 54. In the upper rotational speed range 55, the rotational speed (n) of the internal combustion engine 4 is limited by the control device 28. The part-load rotational speed range 64 advantageously begins at a rotational speed of about 3500 to about 4000 revolutions per minute. The full-load rotational speed range 65 advantageously at least partly includes rotational speeds of about 8000 to about 12,000 revolutions per minute.

In FIG. 8, an example of a variation of a second frequency $f_2$ is plotted with a dotted line. The second frequency $f_2$ corresponds to the frequency with which the second valve 39 is opened. In the first rotational speed range 53, the second frequency $f_2$ varies proportionally with respect to the rotational speed (n). In this case, at each rotational speed (n) of the first rotational speed range 53, the second frequency $f_2$ is exactly half as high as the first frequency $f_1$. The second valve 39 is accordingly opened during each second engine cycle (x).

In the second rotational speed range 54, the second frequency $f_2$ is constant. As a result, in the second rotational speed range 54, the ratio between the first frequency $f_1$ and the second frequency $f_2$ changes as a function of the rotational speed (n). The two valves 24 and 39 therefore open in an uncontrolled manner, simultaneously or with a time offset in relation to one another, depending on the engine cycle. The time intervals 56 and 58 during which the valves 24 and 39 are open are simultaneous, partly overlapping or completely time-offset, depending on the engine cycle. The frequencies $f_1$ and $f_2$ are not coordinated with one another.

In the upper rotational speed range 55, the second frequency $f_2$ varies proportionally with respect to the first frequency $f_1$. The second frequency $f_2$ is one-quarter of the first frequency $f_1$ here. As a result, in the upper rotational speed range 55, fuel is supplied via the second valve 39 during each fourth engine cycle (x). The two valves 24 and 39 are advantageously at least partly simultaneously opened here. As a result, very accurate fuel metering is possible in the upper rotational speed range 55. This is advantageous in particular when the rotational speed of the internal combustion engine 4 is limited by enriching or weakening the fuel/air mixture supplied.

In FIG. 8, by way of example, a further variation of a second frequency $f_3$ for the second valve 39 is plotted. In the first rotational speed range 53, the second frequency $f_3$ corresponds to the first frequency $f_1$. In the second rotational speed range 54, the second frequency $f_3$ fluctuates. The second frequency $f_3$ can be defined as a function of the rotational speed (n) here. However, provision can also be made for the second frequency $f_3$ to be defined additionally by the control device 28 by using further parameters, for example by using the engine load, and for there to be no fixed relationship between the rotational speed (n) and the second frequency $f_3$, as indicated in FIG. 8. In the upper rotational speed range 55, the second frequency $f_3$ varies proportionally with respect to the first frequency $f_1$. In the upper rotational speed range 55, the second frequency $f_3$ is in each case half as high as the first frequency $f_1$. It may also be advantageous to open the second valve 39 with a constant frequency $f_5$ in the second rotational speed range 54. This is shown in FIG. 8 by a dotted line. The variation of the fifth frequency $f_5$ in the first rotational speed range 53 corresponds to that of the first frequency $f_1$ and, in the upper rotational speed range 55, to that of the third frequency $f_3$.

A further example of a variation is shown by a second frequency $f_4$ in FIG. 8. In the first rotational speed range 53, the second frequency $f_4$ is proportional to the rotational speed (n) and twice as high as the first frequency $f_1$. In the second rotational speed range 54, the second frequency $f_4$ is constant. Here, the second frequency $f_4$ corresponds to the highest frequency $f_4$ in the first rotational speed range 53. As a result, the ratio between first frequency $f_1$ and second frequency $f_4$ changes continuously in the second rotational speed range 54 as the rotational speed (n) rises. In the upper rotational speed range 55, the second frequency $f_4$ decreases abruptly, specifically to a frequency value which corresponds to one-third of the first frequency $f_1$. As a result, in the upper rotational speed range 55, the second valve 39 is opened only during each third engine cycle. In addition, in the first rotational speed range 53 and in the upper rotational speed range 55, the frequencies $f_1$ and $f_4$ are coordinated with one another and, in the second rotational speed range 54, are independent of one another and not coordinated with one another.

As FIG. 8 shows, the first rotational speed range 53 lies below the second rotational speed range 54, therefore includes rotational speeds which are lower than those of the second rotational speed range 54. In the first rotational speed range 53, there is advantageously a constant ratio between the first frequency $f_1$ and the second frequency ($f_2$, $f_3$, $f_4$). Here, the first frequency $f_1$ is advantageously exactly as high as the second frequency $f_3$, an integer multiple of the second frequency $f_2$, or the second frequency $f_4$ is an integer multiple of the first frequency $f_1$. As a result, in regularly repeating engine cycles (x), the two valves 24 and 39 are opened simultaneously or with a desired time offset in relation to one another. Advantageously, the two valves 24 and 39 are also opened simultaneously in the upper rotational speed range 55, corresponding to the illustration in FIG. 6, the second valve 39 not opening during each engine cycle (x), but every two, every three or every four engine cycles. In addition, another ratio of the first frequency $f_1$ to the second frequency $f_2$, $f_3$ or $f_4$ in the upper rotational speed range 55 may be advantageous. As a result of the coordination of the frequencies in the first rotational speed range 53 and/or in the upper rotational speed range 55, accurate metering of the fuel can be achieved. As a result, a uniform running behavior of the internal combustion engine 4 can be ensured, in particular in the first rotational speed range 53.

It is understood that the foregoing description is that of the preferred embodiments of the invention and that various changes and modifications may be made thereto without departing from the spirit and scope of the invention as defined in the appended claims.

What is claimed is:

1. A method for operating a combustion engine including a crankcase; a first valve configured to open at a first frequency ($f_1$); an intake channel configured to open into said crankcase via said first valve; a second valve configured to be open for a time duration to control an amount of fuel supplied to said intake channel; and, a control unit operatively connected to said second valve to control said amount of fuel supplied to said intake channel by controlling said time duration; said control unit being configured to determine a second frequency; said second valve being configured to open at said second frequency; said combustion engine having a first rotational speed range and a second rotational speed range; said first rotational speed range and said second rotational speed range being non-overlapping ranges; said first rotational speed range including an idling range; said second rotational speed range including rotational speeds above 8,000 revolutions per minute; the method comprising the steps of:

opening, in the first rotational speed range, the second valve at a second frequency ($f_2$, $f_3$, $f_4$) matched to the first frequency ($f_1$), such that the first frequency ($f_1$) is as large as the second frequency ($f_3$) or the first frequency ($f_1$) is an integer multiple of the second frequency ($f_3$) or the second frequency ($f_4$) is an integer multiple of the first frequency ($f_1$), wherein the second valve is exclusively opened with a second frequency matched to the first frequency in the first rotational speed range; and, opening, in the second rotational speed range, the second valve independently of the first frequency ($f_1$) such that the first frequency ($f_1$) is not as large as the second frequency ($f_3$) and the first frequency ($f_1$) is not an integer multiple of the second frequency ($f_3$) and the second frequency ($f_4$) is not an integer multiple of the first frequency ($f_1$), wherein the second valve is exclusively opened with a second frequency which is independent of the first frequency in the second rotational speed range.

2. The method of claim 1, wherein, in the second rotational speed range, the ratio of the first frequency ($f_1$) to the second frequency ($f_2$, $f_3$, $f_4$) is not constant.

3. The method of claim 1, wherein the combustion engine has a rotational speed (n); and, the first frequency ($f_1$) and the second frequency ($f_2$, $f_3$, $f_4$) are dependent upon the rotational speed (n) of the combustion engine in the first rotational speed range.

4. The method of claim 1, wherein, in the first rotational speed range, the time duration, during which the second valve is opened by the control unit for metering fuel, at least partially overlaps with a second time duration during which the first valve is open.

5. The method of claim 1, wherein the combustion engine includes at least one fuel channel opening into the intake channel; and, the second valve is configured to control the amount of fuel supplied to the intake channel via the fuel channel.

6. The method of claim 1, wherein the second valve has exactly two switching states which include a completely open state and a completely closed state.

7. The method of claim 1, wherein the second valve is an electromagnetic valve.

8. The method of claim 1, wherein the combustion engine has an upper rotational speed range; and, a first operating state includes the upper rotational speed range; the method further comprising the step of:
increasing the amount of fuel metered in the upper rotational speed range so as to cause a limiting of a rotational speed (n).

9. The method of claim 8, wherein the second valve is opened in the upper rotational speed range only when the first valve is also open.

10. The method of claim 1, wherein said first frequency ($f_1$) is less than said second frequency ($f_2$).

11. A method for operating a combustion engine including a crankcase; a first valve configured to open at a first frequency ($f_1$); an intake channel configured to open into said crankcase via said first valve; a second valve configured to be open for a time duration to control an amount of fuel supplied to said intake channel; wherein the intake channel has an inlet opening into the crankcase; the combustion engine further has a cylinder and a piston reciprocatingly mounted in the cylinder; wherein the inlet opening is arranged at the cylinder; and, the piston has a piston skirt configured to open and close the inlet opening to form the first valve; wherein the piston skirt is configured to move along the inlet opening and open and close the inlet opening at fixed positions of the piston when the piston is moving in a reciprocating manner; and, a control unit operatively connected to said second valve to control said amount of fuel supplied to said intake channel by controlling said time duration; said control unit being configured to determine a second frequency with which said second valve is configured to be opened; said combustion engine having a first rotational speed range and a second rotational speed range; said first rotational speed range and said second rotational speed range being non-overlapping ranges; said first rotational speed range including an idling range; said second rotational speed range including rotational speeds above 8,000 revolutions per minute; the method comprising the steps of:

determining said second frequency in said first rotational speed range exclusively in a first manner in which said second frequency is matched to said first frequency such that said first frequency ($f_1$) is as large as said second frequency ($f_3$) or said first frequency ($f_1$) is an integer multiple of said second frequency ($f_3$) or said second frequency ($f_4$) is an integer multiple of said first frequency ($f_1$);

opening said second valve at said second frequency;

determining said second frequency in said second rotational speed range exclusively in a second manner in which said second frequency is determined independent of said first frequency such that said first frequency ($f_1$) is not as large as said second frequency ($f_3$) and said first frequency ($f_1$) is not an integer multiple of said second frequency ($f_3$) and said second frequency ($f_4$) is not an integer multiple of said first frequency ($f_1$);

opening said second valve at said second frequency; and, wherein said first manner and said second manner of determining said second frequency are different from each other.

12. The method of claim 11, wherein:
a first operating state covers the first rotational speed range;
a second operating state covers the second rotational speed range; and,
the rotational speeds of the first rotational speed range are lower than the rotational speeds of the second rotational speed range.

13. The method of claim 12, wherein the first operating state includes a start operation of the combustion engine.

14. The method of claim 12, wherein the first operating state includes an idling operation of the combustion engine.

15. The method of claim 12, wherein the second operating state includes a full-load operation of the combustion engine.

16. The method of claim 11, wherein the combustion engine has an upper rotational speed range; and, a first operating state includes the upper rotational speed range; the method further comprising the step of:
decreasing the amount of fuel supplied in the upper rotational speed range so as to cause a limiting of a rotational speed (n).

17. The method of claim 16, wherein the second valve is opened in the upper rotational speed range only when the first valve is also open.

18. A method for operating a combustion engine including a crankcase; a first valve configured to be open at a first frequency ($f_1$) over successive first time durations; an intake channel configured to open into said crankcase via said first valve; a second valve configured to be open over successive second time durations to control an amount of fuel supplied to said intake channel; and, a control unit operatively connected to said second valve to control said amount of fuel supplied to said intake channel by controlling said second time durations; wherein the control unit is configured to determine a second frequency ($f_2$, $f_3$, $f_4$) with which the second valve is opened; wherein the combustion engine includes a first rotational speed range and a second rotational speed range; the first rotational speed range and the second rotational speed range being non-overlapping; wherein the first rotational speed range includes an idling range and the second rotational speed range includes rotational speeds above 8,000 revolutions per minute; the method comprising the steps of:

determining the second frequency in the first rotational speed range exclusively in a first manner in which the second frequency is matched to the first frequency such that the first frequency ($f_1$) is as large as the second frequency ($f_3$) or the first frequency ($f_1$) is an integer multiple of the second frequency ($f_3$) or the second frequency ($f_4$) is an integer multiple of the first frequency ($f_1$);

opening the second valve at the second frequency;

determining the second frequency in the second rotational speed range exclusively in a manner in which the second frequency is determined independent of the first frequency so as to cause, in said second operating state, displacements between said first time durations at which said first valve is opened and said second time durations at which said second valve is opened with said displacements changing from engine cycle to engine cycle, wherein in said second operating state the first frequency ($f_1$) is not as large as the second frequency ($f_3$) and the first frequency ($f_1$) is not an integer multiple of the second frequency ($f_3$) and the second frequency ($f_4$) is not an integer of the first frequency ($f_1$);

opening the second valve at the second frequency; and, wherein the first manner of determining the second frequency is different from the second manner of determining the second frequency.

* * * * *